US007818864B2

(12) United States Patent
Wilkinson et al.

(10) Patent No.: US 7,818,864 B2
(45) Date of Patent: Oct. 26, 2010

(54) SCRUBBER

(75) Inventors: Sean D Wilkinson, Brockville (CA); Mark Slobodian, Ottawa (CA); Weston Van Wambeke, Towson, MD (US); Todd A Schonewille, Athens (CA); David M Shaver, Brockville (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/115,990

(22) Filed: May 6, 2008

(65) Prior Publication Data

US 2008/0222871 A1 Sep. 18, 2008

Related U.S. Application Data

(62) Division of application No. 11/079,518, filed on Mar. 14, 2005, now Pat. No. 7,414,337.

(51) Int. Cl.
*B23P 11/00* (2006.01)
*H02K 7/14* (2006.01)

(52) U.S. Cl. ............................ 29/428; 29/469; 15/22.1

(58) Field of Classification Search .................. 310/50, 310/42, 47, 48, 89, 68 R; 15/21.1, 22.1; 29/428, 463, 525, 525.02, 469
See application file for complete search history.

(56) References Cited

U.S. PATENT DOCUMENTS

| | | | |
|---|---|---|---|
| 1,198,799 A * | 9/1916 | Westrup | 601/89 |
| 2,357,291 A * | 9/1944 | Smith | 15/385 |
| 2,772,430 A | 12/1956 | Moritt | |
| 2,993,220 A * | 7/1961 | Nix et al. | 15/22.1 |
| 3,024,487 A | 3/1962 | Jones et al. | |
| 3,293,678 A | 12/1966 | South | |
| 3,343,192 A | 9/1967 | Goldstein et al. | |
| 3,358,309 A | 12/1967 | Richardson | |
| 3,396,417 A | 8/1968 | Starr | |
| 3,443,272 A | 5/1969 | Trelc et al. | |
| 3,447,178 A | 6/1969 | Pickering | |
| 3,892,004 A | 7/1975 | Downes | |
| 3,977,084 A | 8/1976 | Sloan | |
| 4,027,348 A * | 6/1977 | Flowers et al. | 15/22.1 |
| 4,060,870 A | 12/1977 | Cannarella | |
| 4,129,257 A | 12/1978 | Eggert | |
| 4,168,560 A | 9/1979 | Doyel | |
| 4,213,471 A | 7/1980 | Burian | |
| 4,241,297 A * | 12/1980 | Piber et al. | 318/17 |
| D262,670 S | 1/1982 | Wellin | |
| 4,409,755 A | 10/1983 | Maddock | |

(Continued)

FOREIGN PATENT DOCUMENTS

DE 1 851 625 2/1962

(Continued)

*Primary Examiner*—Essama Omgba
(74) *Attorney, Agent, or Firm*—Harness, Dickey & Pierce, P.L.C.

(57) ABSTRACT

A method for assembling tool having a housing into which a motor assembly and a battery assembly are inserted. A circuit board can be employed to electrically connecting the battery assembly to the motor assembly even if the battery assembly and the motor assembly are not disposed in an in-line configuration. The circuit board can include a switch that can be employed to selectively operate the tool.

19 Claims, 10 Drawing Sheets

U.S. PATENT DOCUMENTS

| | | | | |
|---|---|---|---|---|
| 4,506,400 | A * | 3/1985 | Klein | 15/22.1 |
| 4,507,865 | A * | 4/1985 | Inaga et al. | 30/276 |
| 4,552,476 | A | 11/1985 | Heraty et al. | |
| 4,556,803 | A * | 12/1985 | Weigert | 307/140 |
| 4,669,452 | A | 6/1987 | Osawa | |
| 4,748,998 | A | 6/1988 | Färber et al. | |
| 4,778,298 | A | 10/1988 | Shin et al. | |
| 4,782,982 | A | 11/1988 | Ellison | |
| 4,792,066 | A | 12/1988 | Kobayashi | |
| 4,835,410 | A * | 5/1989 | Bhagwat et al. | 307/64 |
| D301,398 | S | 6/1989 | Cheung | |
| 4,930,664 | A | 6/1990 | Ellison | |
| 4,930,686 | A | 6/1990 | Ellison | |
| 4,932,094 | A | 6/1990 | McCowin | |
| D311,278 | S | 10/1990 | Swanson | |
| 4,964,398 | A * | 10/1990 | Jones | 601/101 |
| D313,890 | S | 1/1991 | Machuron | |
| 5,170,851 | A * | 12/1992 | Kress et al. | 173/29 |
| 5,207,697 | A * | 5/1993 | Carusillo et al. | 606/167 |
| 5,289,605 | A | 3/1994 | Armbruster | |
| 5,301,381 | A * | 4/1994 | Klupt | 15/22.1 |
| 5,353,461 | A | 10/1994 | Enriquez | |
| 5,375,740 | A | 12/1994 | Umetsu et al. | |
| 5,394,584 | A | 3/1995 | Breitschmid | |
| 5,423,102 | A | 6/1995 | Madison | |
| 5,450,646 | A * | 9/1995 | McHugh et al. | 15/22.1 |
| 5,458,159 | A * | 10/1995 | Kilmer | 140/122 |
| 5,471,695 | A * | 12/1995 | Aiyar | 15/22.1 |
| 5,483,733 | A * | 1/1996 | Hoffman | 29/463 |
| 5,500,972 | A | 3/1996 | Foster | |
| 5,634,572 | A | 6/1997 | Lane, Jr. et al. | |
| 5,664,634 | A * | 9/1997 | McCracken | 173/48 |
| 5,680,666 | A | 10/1997 | Ra | |
| 5,697,115 | A | 12/1997 | Sciarra et al. | |
| 5,701,625 | A | 12/1997 | Siman | |
| 5,718,014 | A | 2/1998 | deBlois et al. | |
| 5,735,620 | A | 4/1998 | Ford | |
| 5,738,177 | A * | 4/1998 | Schell et al. | 173/178 |
| 5,747,953 | A * | 5/1998 | Philipp | 318/139 |
| 5,775,539 | A | 7/1998 | Bates et al. | |
| 5,784,744 | A | 7/1998 | Toran | |
| 5,870,790 | A | 2/1999 | Root et al. | |
| D413,445 | S | 9/1999 | deBlois et al. | |
| 5,956,792 | A | 9/1999 | Gutelius et al. | |
| 5,960,503 | A | 10/1999 | Del Pozo Y Mattei | |
| 5,978,999 | A | 11/1999 | deBlois et al. | |
| 6,000,083 | A * | 12/1999 | Blaustein et al. | 15/28 |
| 6,026,993 | A | 2/2000 | Sperna Weiland | |
| 6,031,969 | A | 2/2000 | Burr et al. | |
| 6,058,542 | A | 5/2000 | Lo | |
| 6,070,117 | A * | 5/2000 | Perrin et al. | 310/68 R |
| 6,076,330 | A * | 6/2000 | Thomas et al. | 53/75 |
| 6,134,738 | A | 10/2000 | Weber | |
| 6,196,045 | B1 * | 3/2001 | Thomas et al. | 72/454 |
| 6,248,007 | B1 | 6/2001 | deBlois et al. | |
| 6,253,405 | B1 | 7/2001 | Gutelius et al. | |
| 6,292,971 | B1 | 9/2001 | Chaudray | |
| 6,360,395 | B2 * | 3/2002 | Blaustein et al. | 15/28 |
| 6,425,701 | B1 | 7/2002 | Jacobs | |
| 6,477,919 | B1 * | 11/2002 | Thomas et al. | 81/3.2 |
| 6,502,766 | B1 | 1/2003 | Streutker et al. | |
| 6,511,336 | B1 | 1/2003 | Turek | |
| 6,553,642 | B2 * | 4/2003 | Driessen | 29/453 |
| 6,554,614 | B1 | 4/2003 | Dubbe et al. | |
| 6,683,396 | B2 * | 1/2004 | Ishida et al. | 310/50 |
| 6,752,330 | B2 | 6/2004 | DiMaggio et al. | |
| 6,792,640 | B2 * | 9/2004 | Lev | 15/28 |
| D498,057 | S | 11/2004 | Ashley et al. | |
| D501,606 | S | 2/2005 | Belt et al. | |
| 6,859,968 | B2 * | 3/2005 | Miller et al. | 15/22.1 |
| 6,932,216 | B2 * | 8/2005 | Blaustein et al. | 206/362.2 |
| 6,952,855 | B2 * | 10/2005 | Lev et al. | 15/28 |
| 6,954,961 | B2 * | 10/2005 | Ferber et al. | 15/22.1 |
| D515,319 | S | 2/2006 | Ashley et al. | |
| D515,818 | S | 2/2006 | Groblebe et al. | |
| 7,044,674 | B2 | 5/2006 | Dixon et al. | |
| 7,134,364 | B2 * | 11/2006 | Kageler et al. | 81/52 |
| 7,359,628 | B2 * | 4/2008 | Broghammer et al. | 388/819 |
| 7,414,337 | B2 * | 8/2008 | Wilkinson et al. | 310/50 |
| 2002/0011531 | A1 | 1/2002 | DiMaggio et al. | |
| 2002/0049398 | A1 | 4/2002 | Wevers | |
| 2002/0074362 | A1 | 6/2002 | Py et al. | |
| 2003/0042330 | A1 | 3/2003 | Streutker et al. | |
| 2003/0052194 | A1 | 3/2003 | Streutker et al. | |
| 2003/0097724 | A1 * | 5/2003 | Park | 15/23 |
| 2004/0010876 | A1 | 1/2004 | Kraemer | |
| 2004/0074025 | A1 | 4/2004 | Blaustein et al. | |
| 2004/0112616 | A1 * | 6/2004 | Broghammer et al. | 173/217 |
| 2004/0169426 | A1 | 9/2004 | Segawa | |
| 2004/0245015 | A1 | 12/2004 | Yoshimi | |
| 2005/0121209 | A1 * | 6/2005 | Shimizu et al. | 173/217 |

FOREIGN PATENT DOCUMENTS

| | | | | |
|---|---|---|---|---|
| DE | 32 872 | | | 11/1964 |
| DE | 1 962 595 | | | 6/1967 |
| DE | 66 07 845 | | | 10/1967 |
| DE | 1 921 071 | | | 11/1970 |
| DE | GM 74 31 959 | | | 3/1975 |
| DE | P 23 46 677.5 | | | 5/1980 |
| DE | G 83 32 941.2 | | | 2/1984 |
| DE | 36 15918 | A1 | | 11/1987 |
| DE | 87 10 130 | | | 6/1988 |
| DE | P 39 12 655.2 | | | 11/1989 |
| DE | G 91 00 264.8 | | | 5/1991 |
| DE | G 92 15 222.8 | | | 2/1993 |
| DE | P 42 26 928.8 | | | 2/1994 |
| DE | 42 34 764 | C2 | | 8/1994 |
| DE | 4315320 | A1 | * | 11/1994 |
| DE | 43 35 445 | A1 | | 4/1995 |
| DE | 43 35 075 | C2 | | 9/1995 |
| DE | 35 10 107 | | | 1/1996 |
| DE | 200 15 053 | U1 | | 11/2000 |
| DE | 102 12 355 | A1 | | 6/2003 |
| DE | 202 14 940 | | | 3/2004 |
| DE | 20 2004 008 250 | U1 | | 10/2004 |
| EP | 0 046 521 | | | 3/1982 |
| EP | 0 275 218 | | | 1/1988 |
| EP | 0 280 527 | | | 8/1988 |
| EP | 280 527 | | * | 8/1988 |
| EP | 0 561 423 | | | 9/1993 |
| EP | 0 847 713 | | | 11/1997 |
| EP | 0 905 038 | | | 9/1998 |
| EP | 0 990 402 | A2 | | 4/2000 |
| EP | 1 302 283 | | | 4/2003 |
| EP | 1850462 | A2 | * | 10/2007 |
| JP | 05329024 | A | * | 12/1993 |
| WO | PCT/EP01/06637 | | | 6/2001 |
| WO | PCT/US01/23310 | | | 7/2001 |
| WO | WO 02/05681 | A2 | | 1/2002 |
| WO | PCT/US02/05435 | | | 2/2002 |
| WO | PCTUS03/032863 | | | 10/2003 |
| WO | WO 03/096860 | A1 | | 11/2003 |
| WO | WO 2004/066783 | | | 8/2004 |

* cited by examiner

SCRUBBER

CROSS-REFERENCE TO RELATED APPLICATIONS

This application is a division of U.S. patent application Ser. No. 11/079,518 filed Mar.14, 2005 (now U.S.Pat. No.7,414,337, issued Aug. 19, 2008). The disclosure of U.S. patent application Ser. No. 11/079,518 is incorporated by reference as if fully set forth in its entirety herein.

INTRODUCTION

The present invention generally relates to motorized tools and more particularly to a motorized tool having a offset battery-to-motor configuration.

Motorized battery-powered hand-held scrubbers of the type that are disclosed in U.S. Pat. Nos. 6,253,405; 6,248,007; 5,978,999; 5,956,792; 5,718,014; and 5,697,115, have proven to fulfill the need in the art for a relatively heavy duty power scrubbing tool. There remains, however, a need in the art for a relatively light duty and inexpensive but ergonomically-configured scrubbing tool.

One known light duty scrubbing tool employs a jam-pot housing wherein the motor is press-fit to the housing. Batteries for powering the motor are loaded into the housing on a side opposite the motor. The in-line configuration of this tool, however, renders it somewhat uncomfortable to operate.

SUMMARY

In one form, the present teachings provide a method that includes: providing a housing assembly with a housing and a circuit board, the housing including a first cavity and second cavity, the first cavity extending through a first end of the housing and having a first longitudinal axis, the second cavity extending through a second end of the housing opposite the first end and having a second longitudinal axis that is not coincident with the first axis and which intersects or is skewed to the first axis so as to form an included angle therebetween that is less than 180 degrees in magnitude, the circuit board being received in the housing and having a switch, a plurality of first terminals and a plurality of second terminals; providing a motor assembly having a motor with a pair of motor terminals; sliding the motor assembly into the first cavity to engage the motor terminals to the first terminals; and sliding a battery assembly into the second cavity to engage a plurality of battery terminals to the second terminals to thereby electrically couple the battery assembly to the motor and the switch.

In another form, the present teachings provide a method that includes: providing a housing with a first cavity and second cavity, the first cavity extending through a first end of the housing and having a first longitudinal axis, the second cavity extending through a second end of the housing opposite the first end and having a second longitudinal axis that is not coincident with the first axis and which intersects or is skewed to the first axis so as to form an included angle therebetween that is less than 180 degrees in magnitude; installing a motor assembly into the first cavity, the motor assembly including a plurality of motor terminals that extend rearwardly toward the second cavity; providing a circuit board having a switch, a plurality of first terminals and a plurality of second terminals; inserting the circuit board into the housing through the second cavity such that the first terminals engage the motor terminals; and sliding a battery assembly into the second cavity to engage a plurality of battery terminals to the second terminals to thereby electrically couple the battery assembly to the motor and the switch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
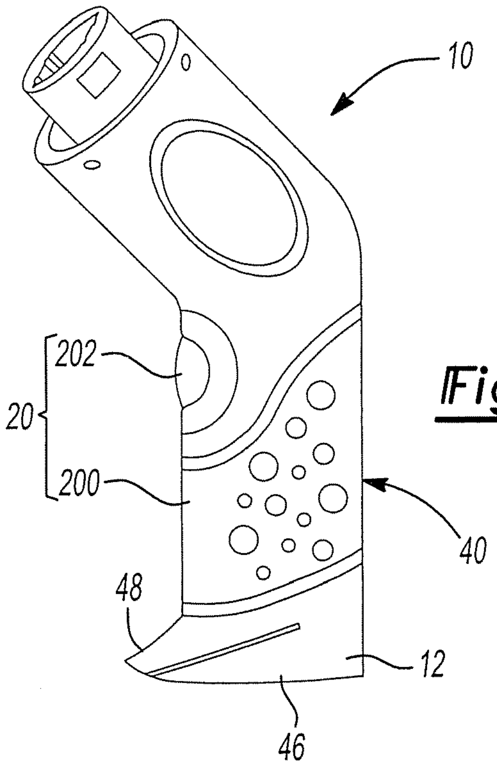
FIG. 1 is a perspective view of a tool constructed in accordance with the teachings of the present invention.
Figure 2:
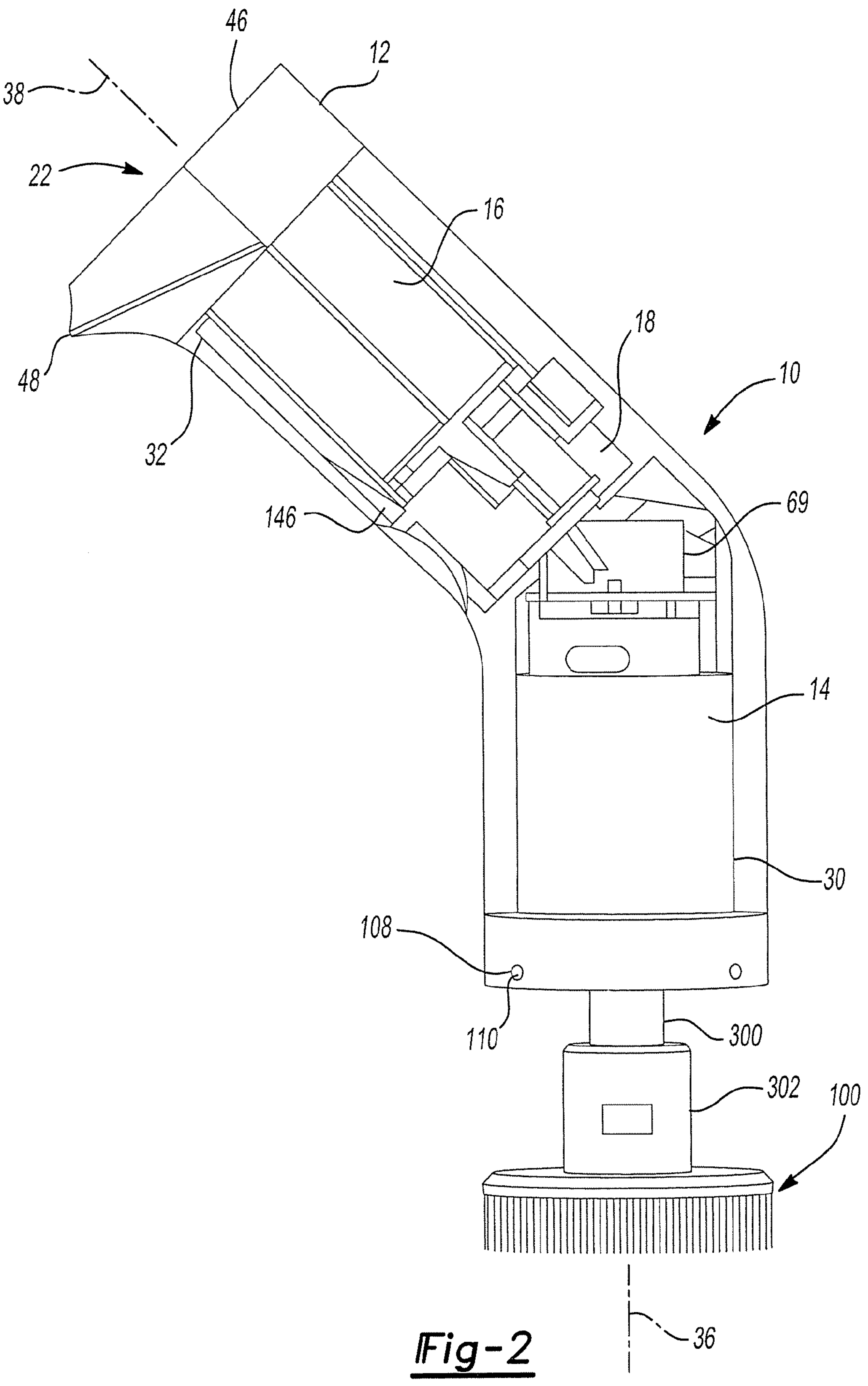
FIG. 2 is a side elevation, partly broken away view of the tool of FIG. 1.

With reference to FIGS. 1 and 2 of the drawings, a hand-held tool constructed in accordance with the teachings of the present invention is generally indicated by reference numeral 10. Although the particular tool provided is illustrated and described herein as being a scrubbing tool, it will be appreciated that the teachings of the present invention have broader applicability and as such, the particular example provided herein will not be viewed as limiting the scope of the disclosure or invention in any way. The tool 10 can include a housing 12, a motor assembly 14, a battery assembly 16, a circuit board 18, an overmold member 20 and a battery door 22.

Figure 1A:
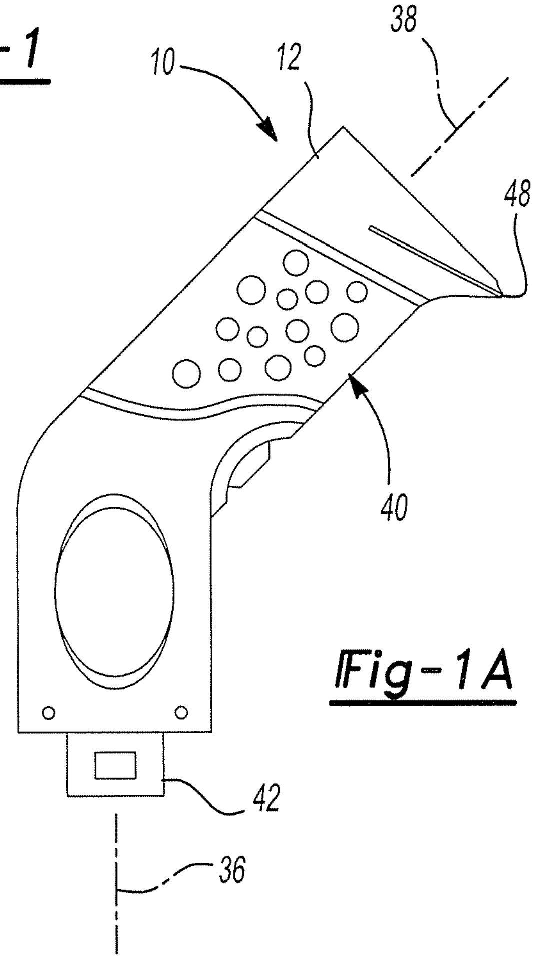
FIG. 1A is a side elevation view of the tool of FIG. 1.
Figure 1B:
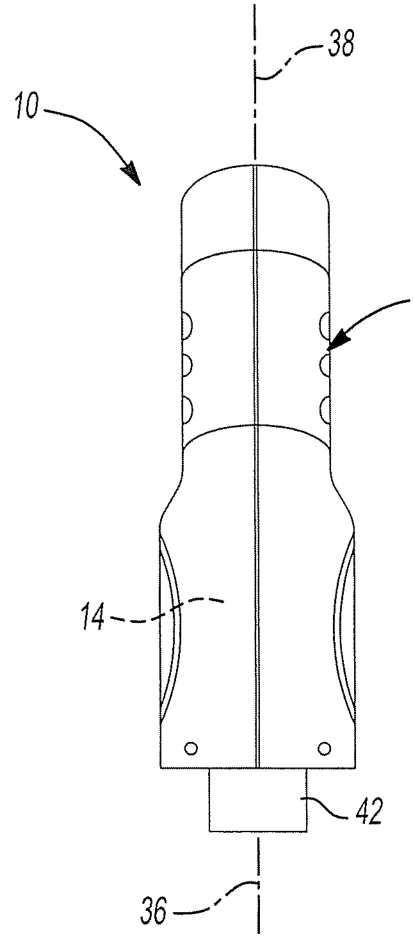
FIG. 1B is a front elevation view of the tool of FIG. 1.
Figure 3:
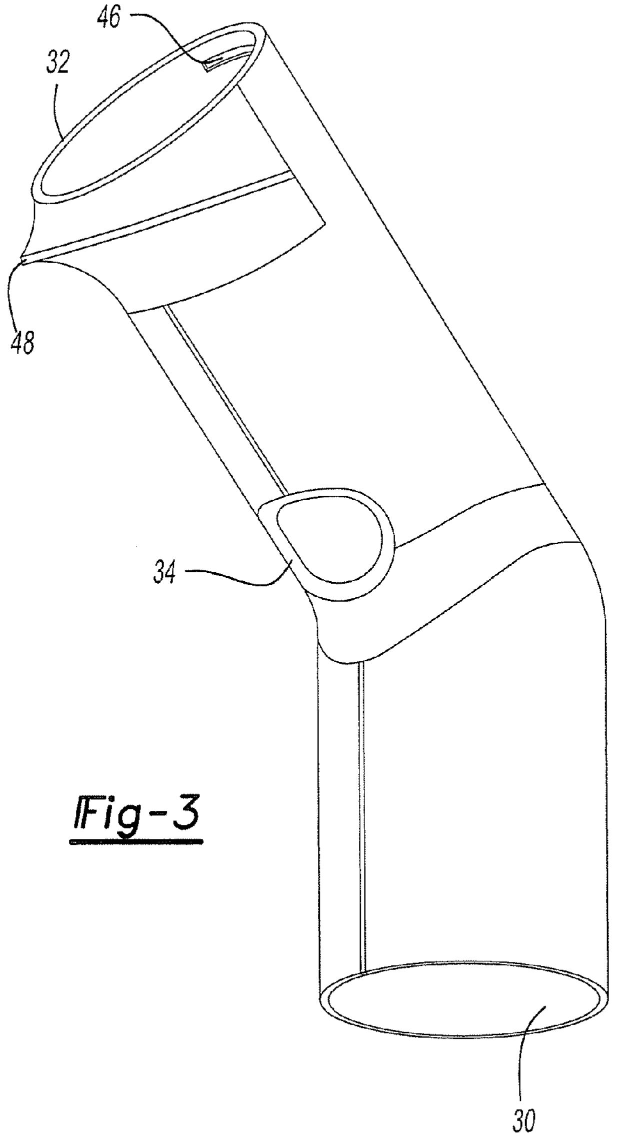
FIG. 3 is a perspective view of a portion of the tool of FIG. 1 illustrating the housing in more detail.

With reference to FIGS. 2 and 3, the housing 12 can be unitarily formed of a plastic material and can define a first cavity 30, a second cavity 32 and a switch aperture 34. In the example provided, the first cavity 30 has a first longitudinal axis 36 and the second cavity 32 has a second longitudinal axis 38. With reference to FIGS. 1A and 1B, the second longitudinal axis 38 is not coincident with the first longitudinal axis 36 and intersects or is skewed to the first longitudinal axis 36 so as to define an included angle therebetween that is less than 180 degrees in magnitude. Configuration in this manner permits a portion of the housing 12 to form a handle 40 that is offset at an included angle relative to an output member 42 of the motor assembly 14 in a manner that renders the tool 10 ergonomically pleasant to operate. The housing 12 can also be configured to define a base 46, which permits the tool 10 to be stood upright thereon as is illustrated in FIG. 1, and/or a scraper 48, which can be employed to scrape residue (e.g., food particles) off of a work surface, such as a dish or pan.

Figure 4:
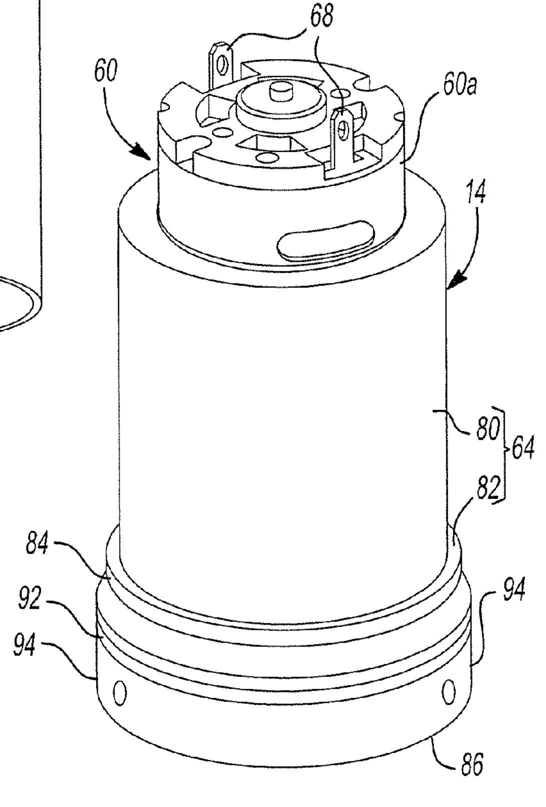
FIG. 4 is a perspective view of a portion of the tool of FIG. 1 illustrating the motor assembly in greater detail.
Figure 5:
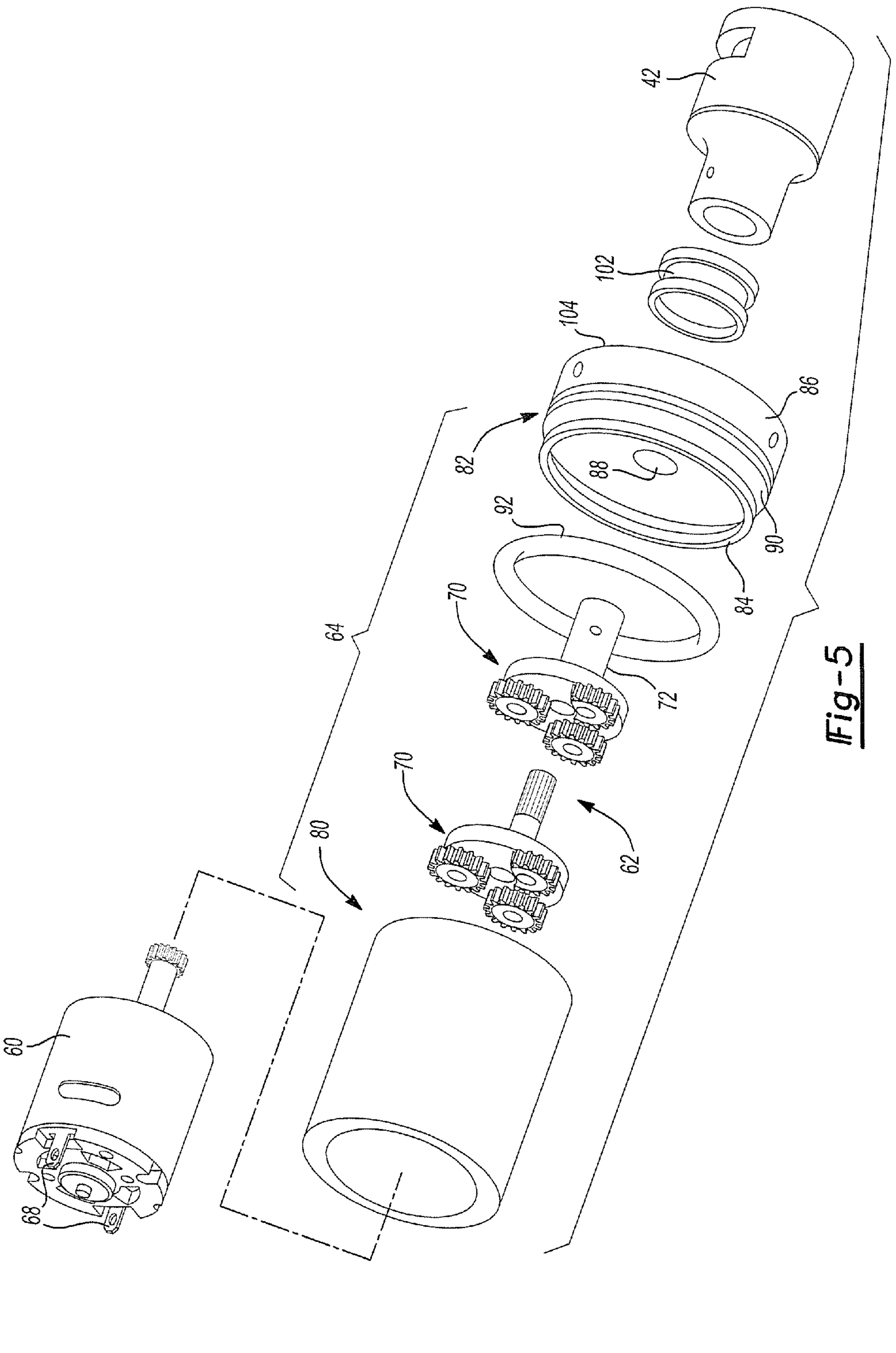
FIG. 5 is an exploded perspective view of the motor assembly.
Figure 8:
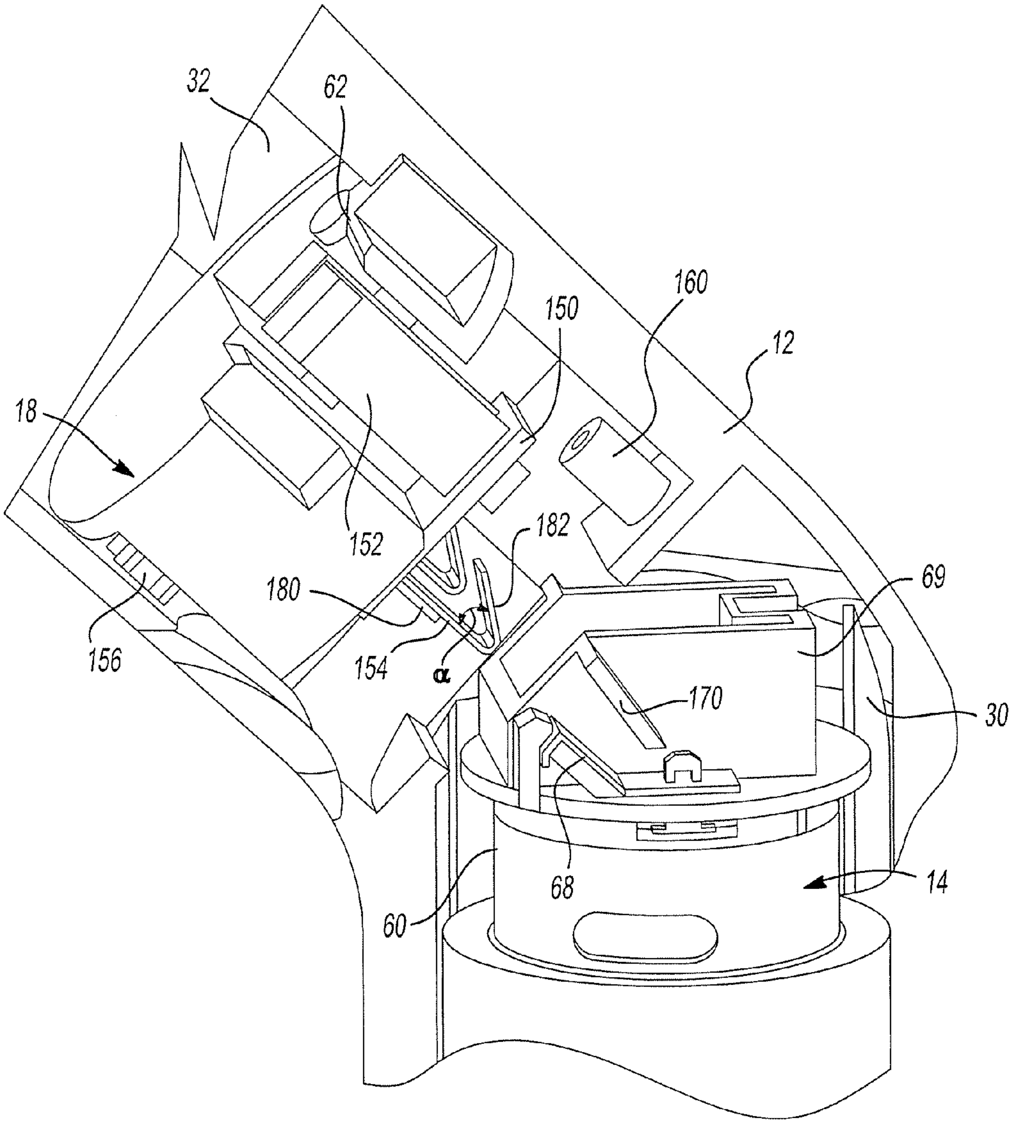
FIG. 8 is an exploded perspective view in partial section of the tool of FIG. 1 illustrating the assembly of the circuit board to the housing and the motor assembly.
Figure 11:
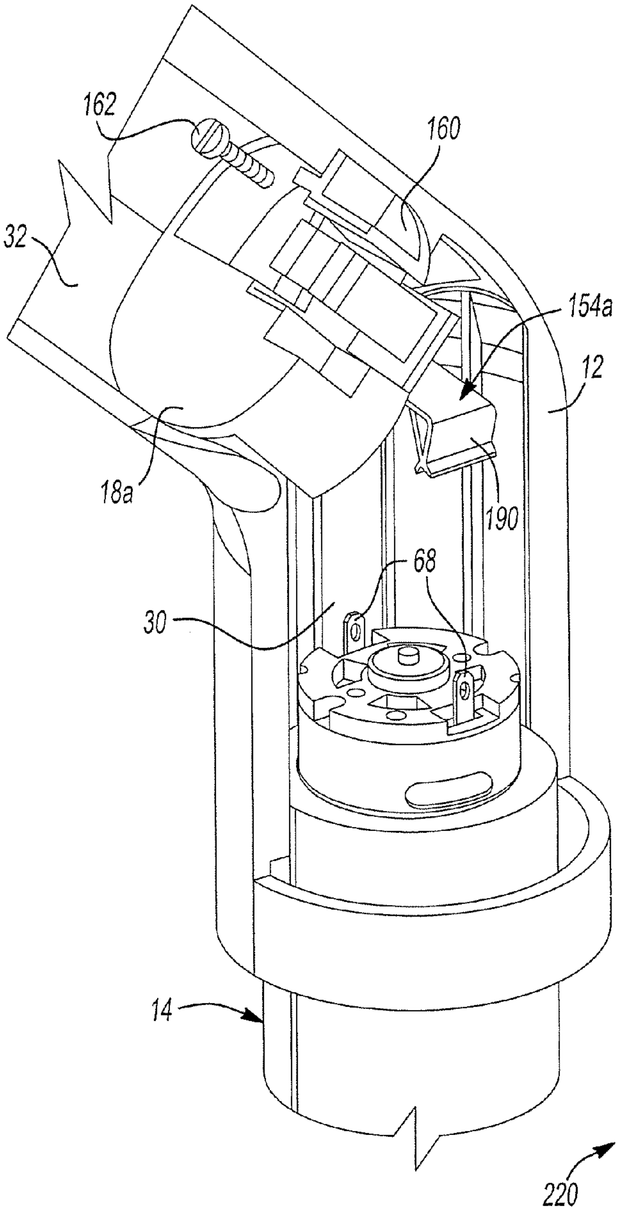
FIG. 11 is an exploded perspective view in partial section of the tool similar to that of FIG. 1 but illustrating the assembly of the circuit board of FIG. 9 to the housing and the motor assembly.

With reference to FIGS. 2, 4 and 5, the motor assembly 14 can include a motor 60, a transmission 62, a gear case assembly 64 and the output member 42. The motor 60 can be a conventional DC motor that is adapted to be powered by the battery assembly 16. The motor 60 includes a pair of motor terminals 68 that can be may extend from the motor 60, as shown in FIG. 11, or that can be integrated into an end cap 69 as shown in FIGS. 2 and 8. The transmission 62, which is optional, can include a gear train that can include one or more planetary gear sets 70 and a transmission output member 72. In the particular example provided, the ring gear (not shown) of the planetary gear sets 70 is formed on the interior of the gear case assembly 64 (i.e., on the interior of the first case member 80). The transmission 62 can be configured to receive a rotary input from the motor 60 and provide a rotary output to the transmission output member 72.

The gear case assembly 64 can include a first case member 80 and a second case member 82. The first case member 80 can be formed in the shape of a generally hollow cylinder that is configured to receive in a press-fit manner the body 60*a* of the motor 60. The second case member 82 can be generally annular in shape and can have a case body 84, which is configured to be coupled to the first case member 80, and a case flange 86 through which an output aperture 88 can be formed. The case body 84 can include a seal groove 90 into which can be disposed an appropriate seal, such as an o-ring 92. Mounting apertures 94 can be formed through the second case member 82 in an appropriate area, such as the case flange 86. The mounting apertures 94 can be oriented generally parallel to one another, generally transverse to the case body 84 and offset from the output aperture 88.

When assembled to the first case member 80, the second case member 82 can cooperate with the first case member 80 to define a transmission cavity (not specifically shown) into which the transmission 62 is disposed. The case flange 86 can be press-fit to the first case member 80 to secure the first and second case members 80 and 82 to one another. Other securing means, such as adhesives, welds, and/or locking tabs, for example, may additionally or alternatively be employed to secure the first and second case members 80 and 82 to one another as those of ordinary skill in the art will appreciate.

The output member 42 can be engaged to the transmission output member 72 and can provide a means by which an accessory attachment 100, such as a brush, pad, disk or sponge, can be coupled. An annular seal 102 can be disposed about the transmission output member 72 which can sealingly engage the exterior face 104 of the case flange 86 as well as seal against one or both of the output member 42 and the transmission output member 72. The annular seal 102 can be configured to resist the infiltration of water and other liquids into the interior of the gear case assembly 64 via the output aperture 88.

The motor assembly 14 may be received into the first cavity 30 in the housing 12 with the motor terminals 68 in a predetermined radial orientation relative to the housing 12 and the mounting apertures 94 in the gear case assembly 64 aligned to corresponding mounting apertures 108 formed in the housing 12. The o-ring 92 can sealingly engage the interior of the housing 12 to inhibit the infiltration of water around the gear case assembly 64 and into the interior of the housing 12. While the first cavity 30 of the housing may be sized to receive all or portions of the gear case assembly 64 in an interference-fit manner (e.g., press fit) to inhibit relative rotation between the motor assembly 14 and the housing 12, those of ordinary skill in the art will appreciate that other mounting techniques may be additionally or alternatively employed. In the example provided, a pair of mounting pins 110 can be employed to fixedly secure the motor assembly 14 to the housing 12. The mounting pins 110, which can be solid pins or roll pins, can be inserted into the corresponding mounting apertures 108 and the mounting apertures 94 to engage both the housing 12 and the gear case assembly 64 to thereby inhibit movement of the motor assembly 14 relative to the housing 12 in both a radial direction and an axial direction.

Figure 6:
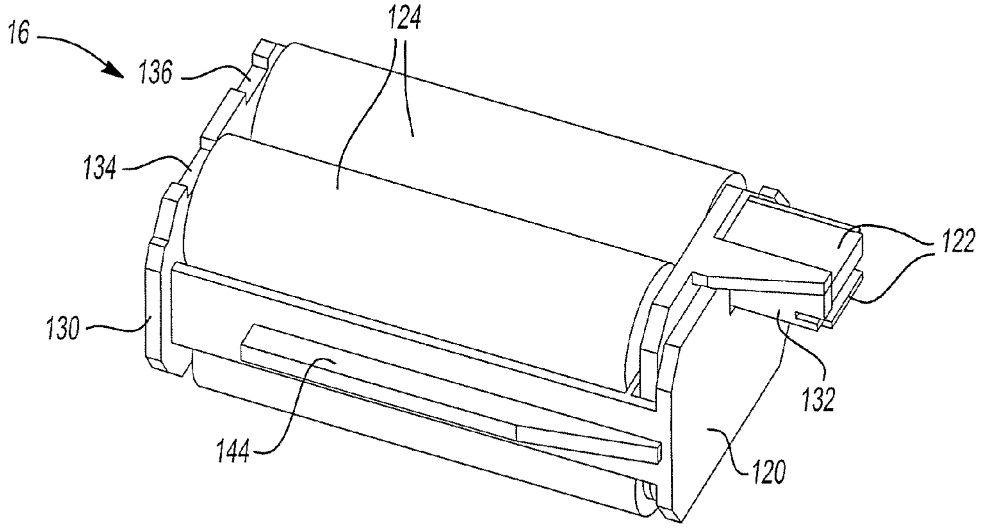
FIG. 6 is a perspective view of a portion of the power tool of FIG. 1 illustrating the battery assembly in greater detail.
Figure 7:
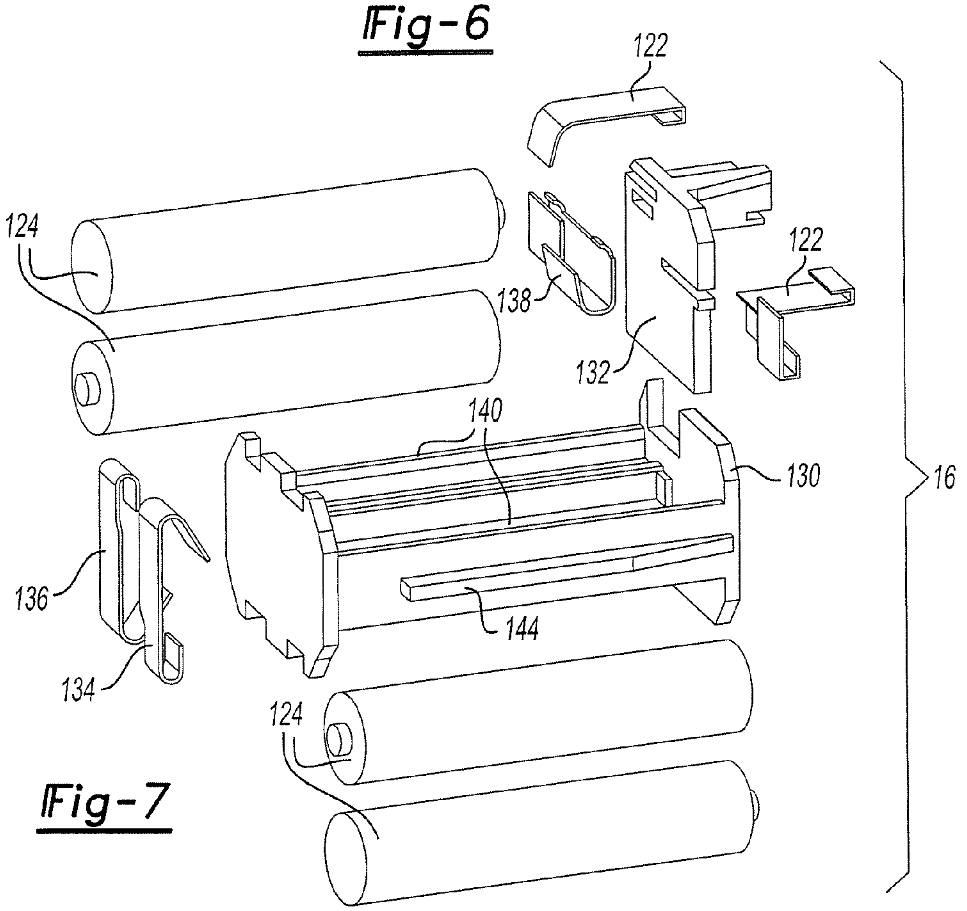
FIG. 7 is an exploded perspective view of the battery assembly.

With reference to FIGS. 2, 6 and 7, the battery assembly 16 can include a battery carrier 120, a pair of battery terminals 122 and a plurality of batteries 124. The batteries 124 can be any type of battery or battery cell, including rechargeable batteries, such as NiCad, nickel-metal-hydride, or lithium-ion batteries, or may be commercially-available disposable battery cells, such as alkaline battery cells.

The battery carrier 120 can include a battery mount 130, a terminal mount 132 and a plurality of transitional terminals 134,136 and 138. The battery mount 130 can define cavities 140 into which the batteries 124 may be disposed. The transitional terminals 134 and 136 can be coupled to an end of the battery mount 130 opposite the terminal mount 132, while the battery terminals 122 and the transitional terminal 138 can be coupled to the terminal mount 132. In the particular example provided, the opposite ends of the battery terminals 122 can be received into respective slots formed onto or through the terminal mount 132, while the transitional terminals 134 and 136 and the transitional terminal 138 can engage the battery carrier 120 and the terminal mount 132, respectively, in a resilient spring clip-like manner. The transitional terminals 134, 136 and 138 can cooperate to connect the batteries 124 in series (to create an “in-series” battery with a negative and positive terminal), while the battery terminals 122 can each be coupled to a respective one of the positive and negative terminals of the batteries (i.e., to a respective one of the negative and positive terminals of the “in-series” battery).

The battery assembly 16 may be “keyed” to the housing 12 so as to inhibit the insertion of the battery assembly 16 in an unintended manner. In the example provided, the battery mount 130 includes a longitudinally-extending rib member 144 that is received into a corresponding groove 146 in the housing 12.

With reference to FIGS. 2 and 8, the circuit board 18 can include a board member 150, a pair of first intermediate terminals 152, a pair of second intermediate terminals 154 and a switch 156. The board member 150 can include wire traces, electrical terminals and/or electrical components, such as solid-state componentry, that can be employed to control the operation of the tool 10. The first intermediate terminals 152 can be adapted to couple the circuit board 18 to the battery assembly 16, while the second intermediate terminals 154 can be adapted to couple the circuit board 18 to the motor assembly 14. The switch 156 can be mounted to the board member 150 and can be disposed between one of the first intermediate terminals 152 and an associated one of the second intermediate terminals 154 to control the distribution of electrical power from the battery assembly 16 to the motor assembly 14.

The circuit board 18 can be installed to the housing 12 in any appropriate manner. In the example provided, the circuit board 18 can be loaded into the second cavity 32 and urged downwardly toward the intersection between the first and second cavities 30 and 32 such that the second intermediate terminals 154 electrically engage the motor terminals 68. In this location, the board member 150 can be abutted against a boss 160 and a threaded fastener 162 may be employed to fixedly secure the board member 150 to the boss 160. Those of ordinary skill in the art will appreciate that other securing means, such as adhesives, welds, and/or locking tabs, for example, may additionally or alternatively be employed to secure the board member 150 to the housing 12.

With reference to FIG. 8, the end cap 69 of the motor assembly 14 can include a rib 170 that is disposed proximate an associated one of the motor terminals 68. Each rib 170 can be arranged so as to be non-parallel to a portion of the associated motor terminal 68 such that the rib 170 and the motor terminal 68 diverge away from one another with increasing distance from the motor 60 (or alternatively stated, with decreasing distance toward the circuit board 18). The second intermediate terminals 154 can include a first portion 180, which can be generally parallel to the axis 38 of the second cavity 32, and a second portion 182, which can be coupled to a distal end of the first portion 180 and can extend from the first portion 180 in such a way as to define an acute included angle α therebetween. Contact between the second portion 182 of the second intermediate terminal 154 and the rib 170 can cause the second intermediate terminal 154 to act like a spring and deflect or bias the first portion 180 of the intermediate terminal 154 into contact with the associated motor terminal 68.

Figure 9:
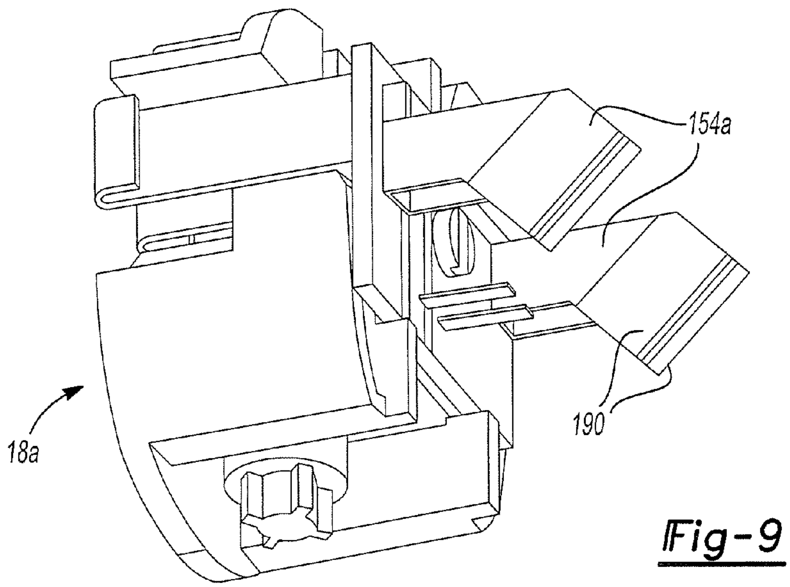
FIG. 9 is a perspective view of an alternately constructed circuit board.
Figure 10:
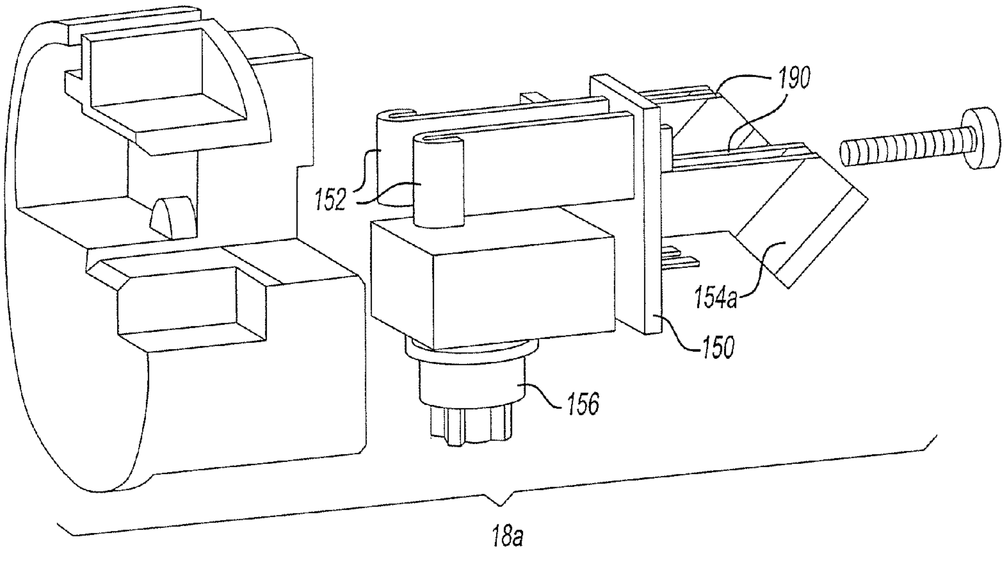
FIG. 10 is an exploded perspective view of the circuit board of FIG. 9.

Alternatively, the circuit board can be constructed in the manner illustrated in FIGS. 9 through 11. In this example, the second intermediate terminals 154*a* can include a pair of terminal members 190 that are biased toward one another and configured to receive a spade-like motor terminal 68. In this example, the circuit board 18*a* can be mounted to the housing 12 in the manner described above (i.e., fit into the second cavity 32 and mounted to a boss 160 via a threaded fastener 162) and thereafter the motor assembly 14 may be inserted into the first cavity 30 of the housing 12 such that the motor terminals 68 are received between the terminal members 190 of each of the second intermediate terminals 154*a*.

Returning to FIGS. 1 and 2, the overmold member 20, which can be optional, can be an elastomeric material, such as a thermoplastic elastomer, that can be applied over the housing 12 to seal the housing 12 and/or to form a gripping area 200 on selected portions of the housing 12, such as the handle 40. In the particular example provided, the overmold member 20 can be employed to seal the switch aperture 34 and to form a resilient button 202 which may be employed by an operator to actuate the switch 156, as well as to optionally cover the mounting pins 110 (FIG. 2) to inhibit their removal.

Figure 12:
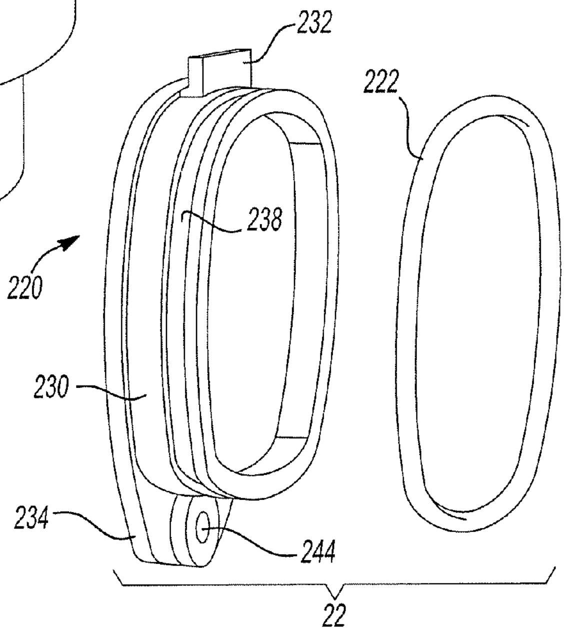
FIG. 12 is an exploded perspective view of a portion of the tool of FIG. 1 illustrating the battery door in greater detail.
Figure 13:
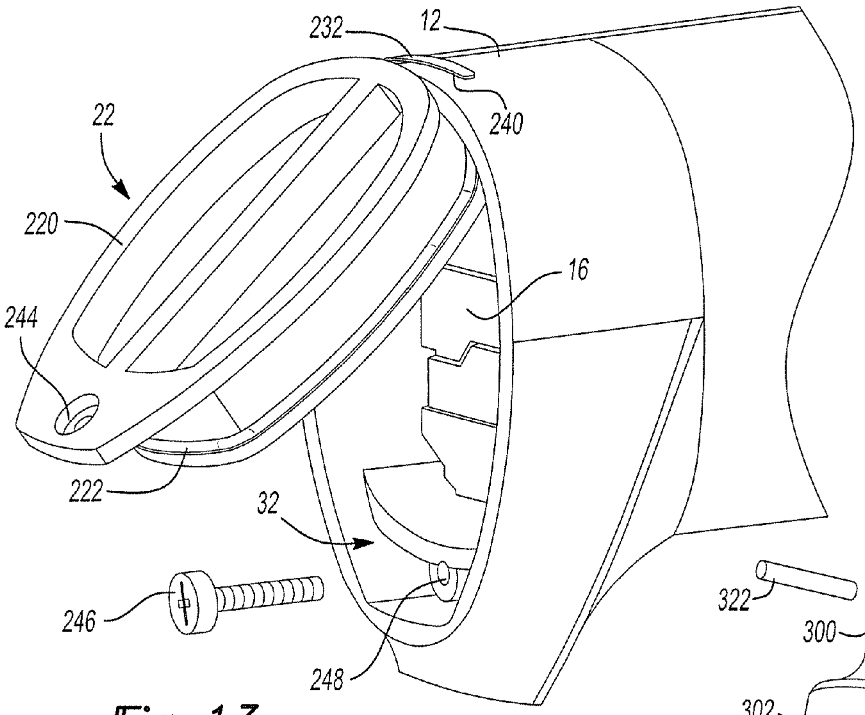
FIG. 13 is an exploded perspective view of a portion of the tool of FIG. 1 illustrating the battery door hingedly coupled to the housing.

With reference to FIGS. 2, 12 and 13, the battery door 22 can include a door structure 220 and a seal 222. The door structure 220 can include a body member 230, an engaging tab 232 that can extend from the body member 230, and a securing tab 234 that can extend from the body member 230 on a side opposite the engaging tab 232. The body member 230 can be sized to fit within the second cavity 32 and abut the battery assembly 16 to inhibit movement of the battery assembly 16 along the second longitudinal axis 38. The body member 230 can define a seal groove 238 into which the seal 222, which may be an o-ring, can be received. The seal 222 sealingly engages the interior of the housing 12 to inhibit water from traveling past the battery door 22 and into the interior of the housing 12. The engaging tab 232 can be sized to engage a corresponding tab aperture 240 that can be formed in the housing 12. Construction in this manner permits the user to insert the engaging tab 232 into the tab aperture 240 when securing the battery door 22 to the housing 12 so that the engaging tab 232 can be employed as a fulcrum about which the door structure 220 is pivoted. The securing tab 234 can be configured to overlie a portion of the housing 12 and can define an aperture 244 through which a threaded fastener 246 can be inserted. The threaded fastener 246 can be threadably engaged to a corresponding threaded aperture 248 in the housing 12 to fixedly but removably couple the battery door 22 to the housing 12.

Figure 14:
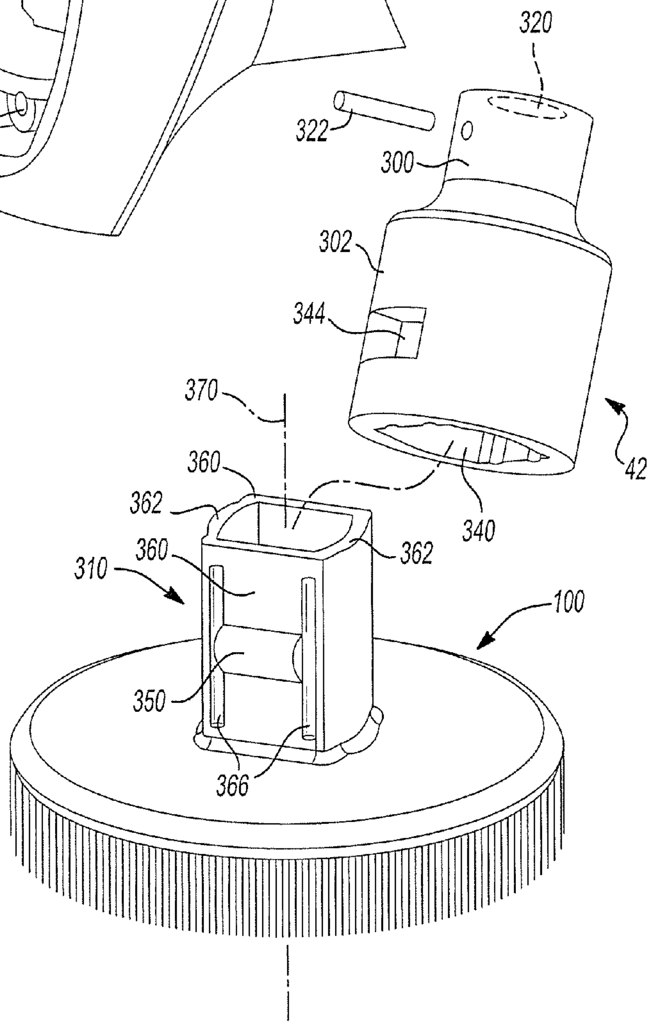
FIG. 14 is an exploded perspective view of a portion of the tool of FIG. 1 illustrating the output member and the drive member of the attachment in greater detail.

With reference to FIGS. 2 and 14, the output member 42 can have a first portion 300, which can be engaged to the transmission output member 72 (FIG. 5), and a second portion 302, which can be engaged to a drive portion 310 of an accessory 100. In the example provided, the first portion 300 includes a circular aperture 320 into which the transmission output member 72 (FIG. 5) is received. Any appropriate coupling means can be employed to non-rotatably couple the first portion 300 and the transmission output member 72 (FIG. 5) to one another, such as a pin 322 that can be inserted through apertures formed in the first portion 300 and the transmission output member 72 (FIG. 5) and secured in place via an interference fit with one or both of the first portion 300 and the transmission output member 72 (FIG. 5). The second portion 302 can include a bore 340 and one or more securing recesses 344. The bore 340 can be sized to receive the drive portion 310 while the securing recesses 344 can be configured to receive an associated engagement feature 350 that is formed on the drive portion 310.

The drive portion 310 of the drive portion 310 can have a hollow interior and can be of any appropriate shape. In the particular example provided, the drive portion 310 is shaped in the general form of a hollow square prism having a pair of first sides 360 and a pair of second sides 362 each of which being generally transverse to and coupling the first sides 360. A pair of slots 366 can be formed in each of the first sides 360 in a direction that is generally parallel to a rotational axis 370 of the attachment 100. Each engagement feature 350 can be formed on an associated one of the first sides 360 at a location between the slots 366 and between the vertical ends of the slots 366.

Figure 17:
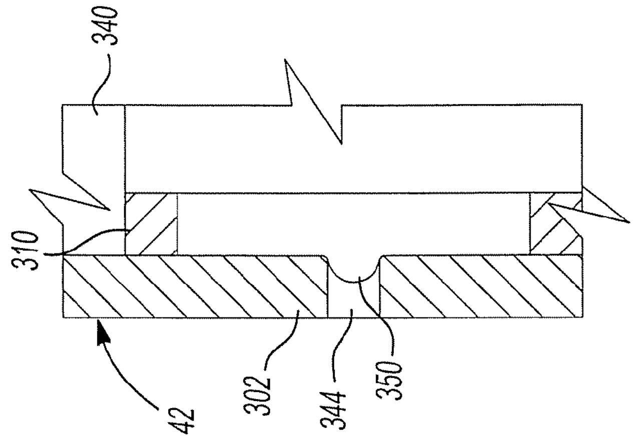
FIGS. 15 through 17 are sectional views of a portion of the tool of FIG. 1 illustrating the coupling of the drive member to the output member, the section being taken longitudinally through one of the slots in the drive member.
Figure 16:
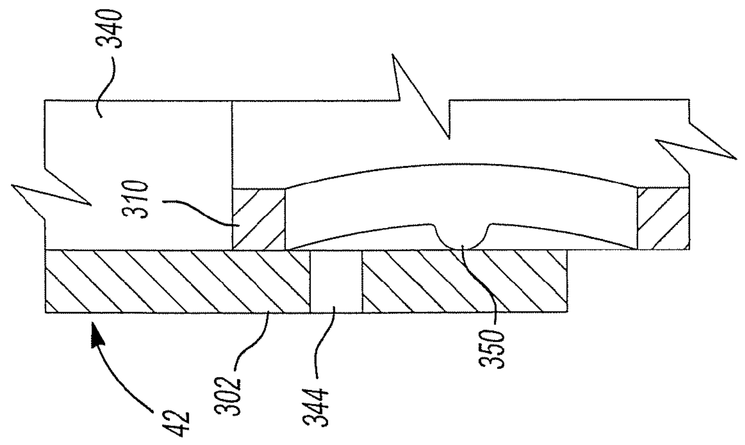
Figure 15:
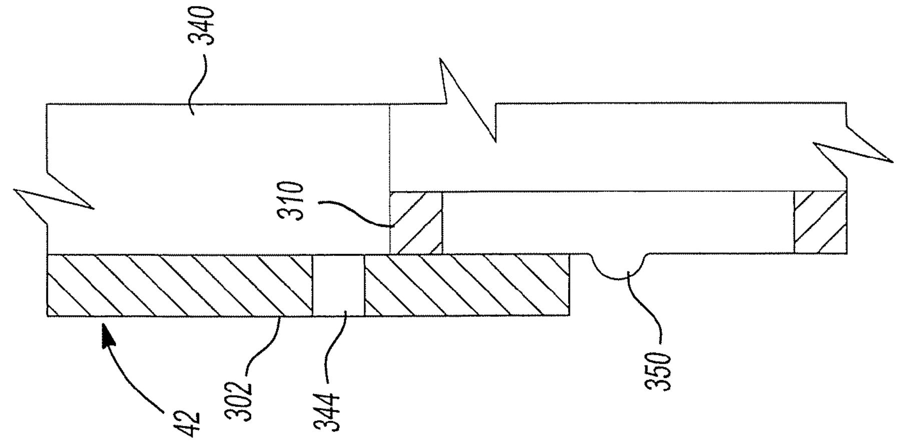

With additional reference to FIGS. 15 through 17, when coupling the drive portion 310 of the drive portion 310 to the output member 42, the drive portion 310 is located into the bore 340 in the second portion 302 and the first sides 360 are positioned in-line with the securing recesses 344. Thereafter, the drive portion 310 and the output member 42 are urged together. Contact between the engagement features 350 and the output member 42 causes the first sides 360 to deflect inwardly toward the rotational axis 370 of the attachment 100. The resilient nature of the first sides 360 causes the first sides 360 to deflect outwardly when the engagement features 350 are aligned to the securing recesses 344. Similarly, when the attachment 100 is to be removed from the output member 42, the withdrawing force exerted on the drive portion 310 drives the engagement features 350 against the output member 42 such that the first sides 360 deflect inwardly so that the engagement features 350 disengage the securing recesses 344. Construction of the output member 42 and the drive portion 310 of the attachment 100 in this manner provides secure coupling of the attachment 100 in a manner that permits the drive portion 310 to fail at a relatively lower torque than that which would cause the output member 42 to fail.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method comprising:

providing a housing assembly with a housing and a circuit board, the housing including a first cavity and second cavity, the first cavity extending through a first end of the housing and having a first longitudinal axis, the second cavity extending through a second end of the housing opposite the first end and having a second longitudinal axis that is not coincident with the first axis and which intersects or is skewed to the first axis so as to form an included angle therebetween that is less than 180 degrees in magnitude, the circuit board being received in the housing and having a switch, a plurality of first terminals and a plurality of second terminals, wherein providing the housing assembly includes forming a pair of housing half shells, assembling the circuit board to a first one of the housing half shells, and coupling the housing half shells to one another;

providing a motor assembly having a motor with a pair of motor terminals;

sliding the motor assembly into the first cavity to engage the motor terminals to the first terminals; and sliding a battery assembly into the second cavity to engage a plurality of battery terminals to the second terminals to thereby electrically couple the battery assembly to the motor and the switch.

2. The method of claim 1, wherein the motor assembly includes a case member and wherein coupling the housing half shells to one another includes fixedly coupling the case member to the housing half shells.

3. The method of claim 2, wherein a pair of pins are disposed through the case member, each of the pins being engaged to an associated one of the housing half shells.

4. The method of claim 2, wherein the motor assembly further includes a transmission disposed between the motor and the case member.

5. The method of claim 4, wherein the transmission is received in a body having a cylindrical aperture and wherein the motor is press-fit into the body.

6. The method of claim 1, wherein the battery assembly includes a battery carrier and a plurality of batteries, the battery terminals being mounted on the battery carrier, the batteries being mounted on the battery carrier and engaged by the battery terminals.

7. The method of claim 6, wherein the battery carrier includes a first keying feature and the housing includes a second keying feature that matingly engages the first keying feature.

8. The method of claim 7, wherein one of the first and second keying features includes a longitudinally extending rib and wherein the other one of the first and second keying features includes a longitudinally extending slot.

9. A method comprising:

providing a housing with a first cavity and second cavity, the first cavity extending through a first end of the housing and having a first longitudinal axis, the second cavity extending through a second end of the housing opposite the first end and having a second longitudinal axis that is not coincident with the first axis and which intersects or is skewed to the first axis so as to form an included angle therebetween that is less than 180 degrees in magnitude;

installing a motor assembly into the first cavity, the motor assembly including a plurality of motor terminals that extend rearwardly toward the second cavity;

providing a circuit board having a switch, a plurality of first terminals and a plurality of second terminals;

inserting the circuit board into the housing through the second cavity such that the first terminals engage the motor terminals; and sliding a battery assembly into the second cavity to engage a plurality of battery terminals to the second terminals to thereby electrically couple the battery assembly to the motor and the switch.

10. The method of claim 9, wherein the housing is formed of a pair of half shells.

11. The method of claim 10, wherein the motor assembly includes a case member that is fixedly coupled to the housing half shells.

12. The method of claim 11, wherein a pair of pins are disposed through the case member, each of the pins being engaged to an associated one of the housing half shells.

13. The method of claim 11, wherein the motor assembly further includes a transmission disposed between the motor and the case member.

14. The method of claim 13, wherein the transmission is received in a body having a cylindrical aperture and wherein the motor is press-fit into the body.

15. The method of claim 9, wherein the battery assembly includes a battery carrier and a plurality of batteries, the battery terminals being mounted on the battery carrier, the batteries being mounted on the battery carrier and engaged by the battery terminals.

16. The method of claim 15, wherein the battery carrier includes a first keying feature and the housing includes a second keying feature that matingly engages the first keying feature.

17. The method of claim 16, wherein one of the first and second keying features includes a longitudinally extending rib and wherein the other one of the first and second keying features includes a longitudinally extending slot.

18. The method of claim 9, wherein the motor assembly further includes a pair of ribs, each of the ribs being non-parallel to an associated on of the motor terminals and wherein each of the first terminals includes a first portion, which is generally parallel to a longitudinal axis of the second cavity, and a second portion that contacts a corresponding one of the ribs to bias the first portion into engagement with a corresponding one of the motor terminals.

19. The method of claim 18, wherein the first terminals are generally V-shaped.

* * * * *